(12) United States Patent
Böing et al.

(10) Patent No.: US 7,840,047 B2
(45) Date of Patent: Nov. 23, 2010

(54) METHOD FOR REPRODUCIBLY GENERATING VIEWS OF TOMOGRAPHIC IMAGE DATA

(75) Inventors: Dieter Böing, Erlangen (DE); Gregor Malischnig, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 901 days.

(21) Appl. No.: 11/783,019

(22) Filed: Apr. 5, 2007

(65) Prior Publication Data

US 2007/0286330 A1 Dec. 13, 2007

(30) Foreign Application Priority Data

Apr. 6, 2006 (DE) .......... 10 2006 016 601
May 19, 2006 (EP) .............. 06010410

(51) Int. Cl.
G06K 9/00 (2006.01)
G01N 23/00 (2006.01)

(52) U.S. Cl. ......................... 382/128; 378/4
(58) Field of Classification Search ............ 128/922; 382/100, 128–132; 378/4
See application file for complete search history.

(56) References Cited

U.S. PATENT DOCUMENTS 7,133,041 B2 * 11/2006 Kaufman et al. ............ 345/419
7,463,712 B2 * 12/2008 Zhu et al. ...................... 378/7
7,471,291 B2 * 12/2008 Kaufman et al. ............ 345/424
7,684,846 B2 * 3/2010 Johnson et al. ............. 600/407

OTHER PUBLICATIONS

Flohr et al.: Spatial domain filtering for fast modification of the tradeoff between image sharpness and pixel noise in computed tomography IEEE Transactions on Medical Imaging vol. 22, Nr. 7, Jul. 2003 p. 846-853 XP011099085 ISSN: 0278-0062.
European Search Report dated Aug. 7, 2007.

* cited by examiner

Primary Examiner—Samir A. Ahmed
Assistant Examiner—Mehdi Rashidian
(74) Attorney, Agent, or Firm—Harness, Dickey & Pierce, P.L.C.

(57) ABSTRACT

Provided is a method for generating views of tomographic image data. At least one view of an object area is generated by image filtering from tomographic CT image data by using a modulation transfer function and coordinate information. A filter algorithm is used for the image filtering and, if appropriate, further view parameters required for generating the view may be stored in a view file assigned to the CT image data. The view file is called up, and the filter algorithm as well as, if appropriate, the further view parameters are applied to the CT image for the purpose of renewed generation of the view.

20 Claims, 6 Drawing Sheets

METHOD FOR REPRODUCIBLY GENERATING VIEWS OF TOMOGRAPHIC IMAGE DATA

PRIORITY STATEMENT

The present application hereby claims priority under 35 U.S.C. §119 on German patent application number DE 10 2006 016 601.9 filed Apr. 6, 2006, and on European patent application number EP06010410 filed May 19, 2006, the entire contents of each of which is hereby incorporated herein by reference.

FIELD

Embodiments of the present invention generally relate to a method for reproducibly generating views of tomographic CT image data of an object area of an object which include at least one X-ray attenuation value for each voxel of the object area.

BACKGROUND

Modern medical imaging methods such as, for example, X-ray computed tomography, can be used to obtain tomographic image data of an examined measurement object, for example a patient. X-ray computed tomography is a specific X-ray recording method with the aid of which it is possible to obtain transverse sectional images, that is to say images of body slices that are aligned substantially perpendicular to the body axis. The tissue-specific physical quantity represented in the image is the distribution of the attenuation value of X-radiation $\mu(x, y)$ in the sectional plane. In addition to these transverse sectional images, it is also possible to obtain volume images of the acquired object area that represent the three-dimensional distribution of X-ray attenuation values $\mu(x, y, z)$. Each volume element, also termed voxel, of the acquired object area is in this case assigned an X-ray attenuation value.

CT images can be generated both with the aid of a conventional computer tomograph having a scanning system that can revolve endlessly, and by way of a C-bow unit. The term CT is used below for both types of imaging units.

The CT image data are calculated with the aid of a reconstruction algorithm from the raw data supplied by the CT unit, which algorithm includes convolution with the aid of a specific convolution core (kernel). Owing to the mathematical configuration of the convolution core, it is possible for the image quality to be influenced specifically when reconstructing a CT image from the raw data. For example, a suitable convolution core can be used to emphasize high frequencies in order to raise the spatial resolution in the image or—with the aid of a convolution core of an appropriately different type—to lower it, in order to reduce the image noise. Thus, during image reconstruction in computed tomography it is possible to use the selection of the convolution core to influence the image characteristic that is characterized by image sharpness/image noise and image contrast.

It is currently necessary to calculate CT images from manufacturer- and product-specific raw data on high power image reconstruction computers developed specifically therefore. In this case, the raw data are stored in a manufacturer-specific format and include no pixel or voxel data. They can therefore not be brought directly to the display, but serve exclusively to reconstruct images or image series.

However, users frequently require different views of the acquired object area with different image parameters. To date, this has required using the raw data to calculate any desired number of series of sectional images by reconstructing the raw data with the aid of different settings, for example with the aid of a different core, different slice thickness, different increment, different FoV (Field of View) or different orientation. Since these parameters and the associated reconstruction algorithms are, however, closely linked to the CT unit that was used to acquire the object area, they are also different for each manufacturer and each type of unit. The desired sectional images can therefore be reconstructed without a problem from the raw data only on the CT system on which they are also acquired.

These series of sectional images form the basis for post-processing, archiving, transfer to other image processing or imaging units and, finally, diagnosis. The so-called DICOM (Digital Imaging and Communications in Medicine) standard is used for the transfer. Images and data from different imaging and image processing units can be exchanged among one another with the aid of this standard. However, in addition to the storage requirement for the raw data, the provision of different image series also necessitates the storage requirement for the image series, and this can certainly amount to several gigabytes.

Consequently, transferring the image series and loading them into CT applications for the purpose of postprocessing are also very time consuming and disadvantageously impair the clinical workflow. The reconstruction of different image series from the raw data likewise requires a substantial time outlay. Keeping the raw data to hand on the CT system for the purpose of later reconstruction requires a great deal of storage and is therefore very restricted in time for reasons of cost. As a rule, the raw data can currently be kept to hand only for a few days. The raw data can also be archived on optical storage media, for example, in order to lengthen the time at which they can be kept to hand. However, the archiving operation and the later importing of the raw data are likewise time consuming, and are therefore scarcely carried out in practice.

For the purpose of reproducibly generating views of CT image data, the DICOM standard discloses the so-called 2D presentation states in which the value range of the CT values that is to be displayed, the so-called window, the image segment in pixel data, as well as a digital zoom onto the pixel data are stored. The so-called gray scale, color and blending presentation states enable the filing of color and/or gray scale coding tables and of rotation and transformation matrices for a linear registration with transformation for two image series (PET-CT, SPECT-CT). An organ-referred view of a volume or volume segment (3D object) with a variable image impression, that is to say different image sharpness/image noise or different image contrast, is therefore impossible.

SUMMARY

In at least one embodiment, the present invention specifies a method for reproducibly generating views of tomographic image data that requires only a low storage requirement and can generate views with the aid of different image parameters, in particular with the aid of different image sharpness/image noise and different image contrast.

In the case of at least one embodiment of the proposed method, provision is made of tomographic CT image data of an object area of an object, which include at least an X-ray attenuation value for each voxel of the object area, together with a three-dimensional modulation transfer function of the CT image data or a function from which the three-dimensional modulation transfer function can be derived, and of coordinate information from which coordinates of the voxels included in the CT image data can be derived in a fixed reference system of the object. At least one view of the object area is generated by image filtering from the CT image data by using the modulation transfer function and the coordinate information, wherein a filter algorithm used for the image filtering and, if appropriate, further view parameters required for generating the view is/are stored in a view file assigned to the CT image data. For the purpose of renewed generation of the view the view file is called up, and the filter algorithm as well as, if appropriate, the further view parameters are applied anew to the CT image data.

At least one embodiment of the present invention makes use here of the provision of CT image data and an additional item of information that comprises the three-dimensional modulation transfer function of the CT image data and the coordinate information. The CT image data are generated in a known way by way of X-ray imaging, that is to say with the aid of a CT unit, and stored. The raw data occurring during the acquisition of the object area are firstly reconstructed on an image reconstruction computer with the aid of a suitable convolution core that preferably generates a high-resolution image. This should be performed immediately at the location of the data production, that is to say with the aid of the image reconstruction computer of the CT unit used to record the data. The raw data can thereafter be discarded.

In this case, the CT image data are preferably stored in a common data record together with the three-dimensional modulation transfer function of the image data, or a function from which the three-dimensional modulation transfer function can be derived, and the corresponding coordinate information. This data record forms the basis of later postprocessing, archiving, the transfer to other units and/or stations, and finally for diagnosis. Together with the 3D modulation transfer function and the coordinate information, the data record includes all information so as to generate any desired view of the object area at any desired workplace from the data, also denoted below as data view.

Owing to the knowledge of the modulation transfer function of the CT image data, the same results that are obtained from the raw data with the aid of the reconstruction previously carried out can be attained by pure image filtering with the aid of a suitable filter. In particular, given knowledge of this 3D modulation transfer function images with different sharpness and different noise can be generated from the CT image data by different filters. Such image filtering is disclosed in DE 102 38 322 A1, the entire disclosure content of which is hereby incorporated herein by reference, from this point of view in the present patent application. Of course, the aforementioned advantages can also be attained when the data or information provided are not stored in a single data record, but are divided over a number of data records from which it must then, however, be possible to detect the mutual assignment.

In the case of at least one embodiment of the present method, it is possible by way of image filtering to generate at least one desired view of the object area from the CT image data provided with the additional information by using the modulation transfer function and the coordinate information. This view can constitute any desired data view of the CT image data, in particular slice and/or sectional images, with different sharpness, different noise, different orientation, different image segments and different slice thicknesses. The filter and/or filter algorithm used for the requisite filtering of the CT image data, and the further view parameters, for example image segment or image orientation, are then stored in a view file assigned to the CT image data. This view file is denoted below as advanced presentation state (APS) by analogy with the known 2D presentation states from the DICOM standard.

An APS thus represents any desired view of the CT image data that can be present as a volume data record or as a slice image stack. The APS replaces the present reconstruction, since it no longer requires raw data, and simultaneously stores all the results of applications in a standard format. The appropriate view can be generated again reproducibly at any desired unit at any time owing to the storage of these parameters, in particular the filter algorithm used. Both the slice image stack or volume data record, and the APS can be stored as DICOM objects in a DICOM archive (for example PACS). It is thereby possible for a user to prepare all image views relevant for a diagnosis at any desired DICOM workstation in conjunction with a very low storage requirement. All interactions on the CT image data that lead to the determination of diagnostically relevant image data can be stored in the APS.

Present day applications manipulate the original data record, that is to say the raw data, generally in the image segment, in the slice thickness, in the filter, in the color coding, in the orientation in space, calculate measured values, define segments for delimiting organs and vessels, render a volume, in order to generate a 3D effect in a 2D view, quantify image results or define paths for a virtual camera guidance through the body (for example colon, bronchi). CAD algorithms (CAD: Computer Aided Diagnosis) mark volume segments and classify these as diseased or healthy. All these results can be stored in an APS in order to obtain exactly the same views as already once generated in the case of another user or at another data station at a later point in time. This requires no renewed reconstruction from the raw data, since in the case of the present method there is a return only to the CT image data record that has once been reconstructed and stored together with the 3D modulation transfer function and the coordinate information.

This CT image data record with the additional information forms the database for all the parameters stored in the APS. This CT image data record preferably constitutes a volume data record that is also denoted as IVB (Image Volume Database) below, together with the additional information. The IVB then constitutes the database for further processing. The IVB can replace the present day manufacturer- and product-specific CT raw data in the case of postprocessing, archiving and the transfer to other image processing or imaging units. The IVB is preferably stored in a new DICOM standard format. One possibility for this is to expand the present day DICOM-CT multiframe. Here, the IVB replaces the CT raw data such that the latter are no longer required after the one off reconstruction of the IVB. In this case, the IVB does not contain a slice stack composed of different sectional images, but volume data with a defined coordinate system. In addition to the CT image data, the IVB can also store the topogram(s) of a CT examination, if such topograms are acquired.

The coordinate information from which coordinates of the voxels, acquired from the CT image data, of the object area can be derived in a fixed reference system of the object are preferably formed solely from a coordinate value for one of the voxels, and from directional and distance information of the remaining voxels. Since the voxel data are usually reconstructed on an equidistant raster, the voxel coordinates can be defined by direction vectors that describe the three axes (for example unit vectors $e_x$, $e_y$, $e_z$) and increments or deltas (for example $d_x$, $d_y$, $d_z$). In order to describe the aperture of the voxels, use is made of three one-dimensional modulation transfer functions, for example in the direction of x, y and z, by which the 3D modulation transfer function is formed.

As an alternative to the modulation transfer function, it is, of course, also possible to use the point image function or sensitivity profiles from which the 3D modulation transfer function can be derived. The knowledge of this transfer function permits the subsequent variation of the image sharpness/slice thickness of the respective CT image. The 3D modulation transfer function describes the quality of the imaging of the object area onto the CT image data, which is a function of the imaging system itself, that is to say the CT unit and, if appropriate, also of the reconstruction algorithm used. The modulation transfer function can be determined for each CT system and, by way of example, be stored as a value table after digitization.

By applying different filter algorithms, at least one embodiment of the present method can be used for different applications to generate various views of the object area that differ in image sharpness and/or image noise and/or in a slice thickness of a fundamental slice of the object area. In this case, a dedicated view file, that is to say a dedicated APS, is preferably stored for each of the various views. In this case, an APS includes a reference to the relevant basic data record, that is to say the volume data record (IVB) or slice stack, and to the information relating to the applied filter algorithm. The image segment (FoV: Field of View), the orientation in space and/or a VRT preset (rendering parameter, color table) can be stored as further view parameters in the APS, for example.

Furthermore, there is the possibility of storing in the APS any desired number of 3D volume segments in the coordinate system of the volume data record, paths for a guided view, for example colon/bronchi fly through, or so-called key images as 2D sectional planes (including curved ones), this being done in a fashion oriented with specific rotation in the coordinate system of the volume data record. In addition, markers, annotations or distance/volume measurements that have been carried out on the view can be stored in the APS. For example, markers can be stored as 2D or 3D information, for example as a point, as an ROI (Region of Interest) or as a VOI (Volume of Interest).

With at least one embodiment of the present method, there is no longer a necessity for image series with different quality properties to be reconstructed separately from the raw data. The respectively desired image impression can be presented directly to the user, the previously required waiting for the results of the reconstructions, and the quality check, which does not result until thereafter, for confirming the desired image quality being dropped. In addition to the large time saving when regenerating a view, the data volume can also be drastically reduced, since, for example, there is also no longer a need for a thin slice series, which to date have primarily formed the input for postprocessing steps, to be reconstructed from raw data, rather they need only be stored as APS.

With the APS, the user always has available the already mentioned possibilities of real time filtering in an axial direction (corresponds to present day reconstruction core) and in a z-direction (slice thickness and reconstruction increment), at any time after data acquisition. All interactions on the volume that lead to the determination of the diagnostically relevant image data can be stored in the APS. Here, in addition to the definition of the image series it is also possible to enable the marking of individual images, and the inputting of commentaries or findings.

As an additional advantage compared to the previously available 2D presentation states, 3D segments for isolating tumors, vessel trees etc can also be stored in the proposed APS. Furthermore, any desired number of straight or curved sections with any desired orientation in the coordinate system of the volume data record can be stored in the APS, and can be read out appropriately from each application in order to address specific 2D sections as key images.

An apparatus for carrying out at least one embodiment of the method includes in this case an arithmetic logic unit that has an interface to a database on which the CT image data are stored, preferably as IVB. An imaging module goes back to a desired APS on the database, reads it out and processes the CT image data in accordance with the parameters specified in the APS. Also provided is an APS generating module that stores filter algorithms applied to the image data by a user and, if appropriate, additional view parameters as APS in the database. In this way, new APS can be generated from the original CT image data record by interaction with the user, or views can be displayed on the basis of known APS.

BRIEF DESCRIPTION OF THE DRAWINGS

The present method is explained in more detail below once again with the aid of example embodiments in conjunction with the drawings, without restricting the scope of protection prescribed by the patent claims. In the drawings;

DETAILED DESCRIPTION OF THE EXAMPLE EMBODIMENTS

Figure 1:
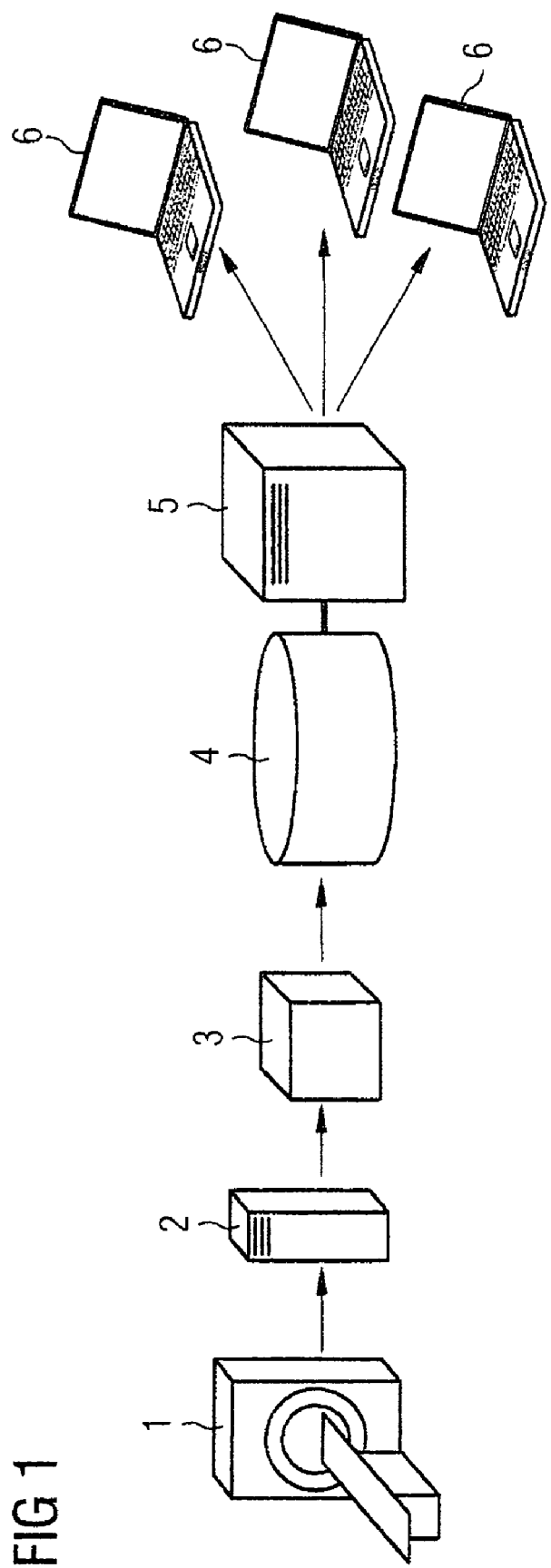
FIG. 1 shows an overview of the provision of the tomographic image data.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 gives an overview of the work flow in the generation of views of tomographic image data in accordance with an embodiment of the present method. The first step is to record the CT image data of the area of the object with the aid of a CT unit 1. This CT unit 1 can be a computer tomograph or else a C-bow unit. For the purpose of image reconstruction from the CT scan, the measured raw data are relayed to an image computer 2 with the aid of which a 3D image data record can be generated from the raw data by using a suitable reconstruction algorithm. In the present example, this 3D image data record is a volume data record in which each volume element (voxel) of the examined object area is assigned an X-ray attenuation value $\mu(x, y, z)$ or a gray scale value derived therefrom.

This volume data record is used to generate a data record with additional information that includes the 3D modulation transfer function of the CT image data as well as information relating to the voxel coordinates of the CT image data record. This new volume data record, the IVB 3, is transferred to a central database 4 and stored there. The central database 4 is connected to an application server 5 in which the desired data view is generated from the IVB 3 and transferred to an appropriate client 6.

Figure 3:
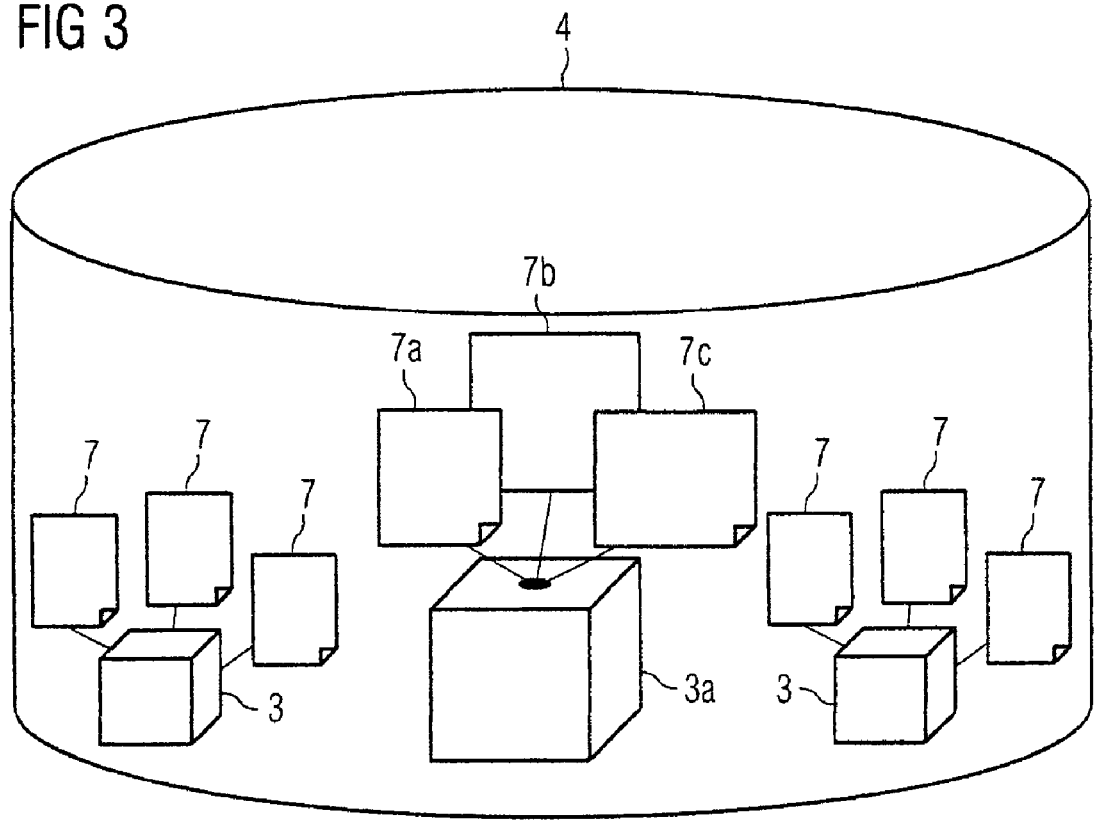
FIG. 3 shows an example of a central memory with IVBs and APSs.

The APSs 7 belonging to the data views are also stored in the central database 4, specifically being assigned to the respective IVBs 3. This is to be seen in FIG. 3, which illustrates schematically by way of example three IVBs with the associated APSs. Of course, the number of APSs is not limited, but is a function only of the number of the desired different data views. Emphasized in the middle region of the central database 4 is an example in the case of which one of the APSs, 7a, includes an illustration of pulmonary nodules another, 7b, comprises an illustration of the extracted heart, and a third, 7c, comprises a data view, specifically generated by a user, of the IVB 3a, in this example of the thorax of a patient.

Figure 2:
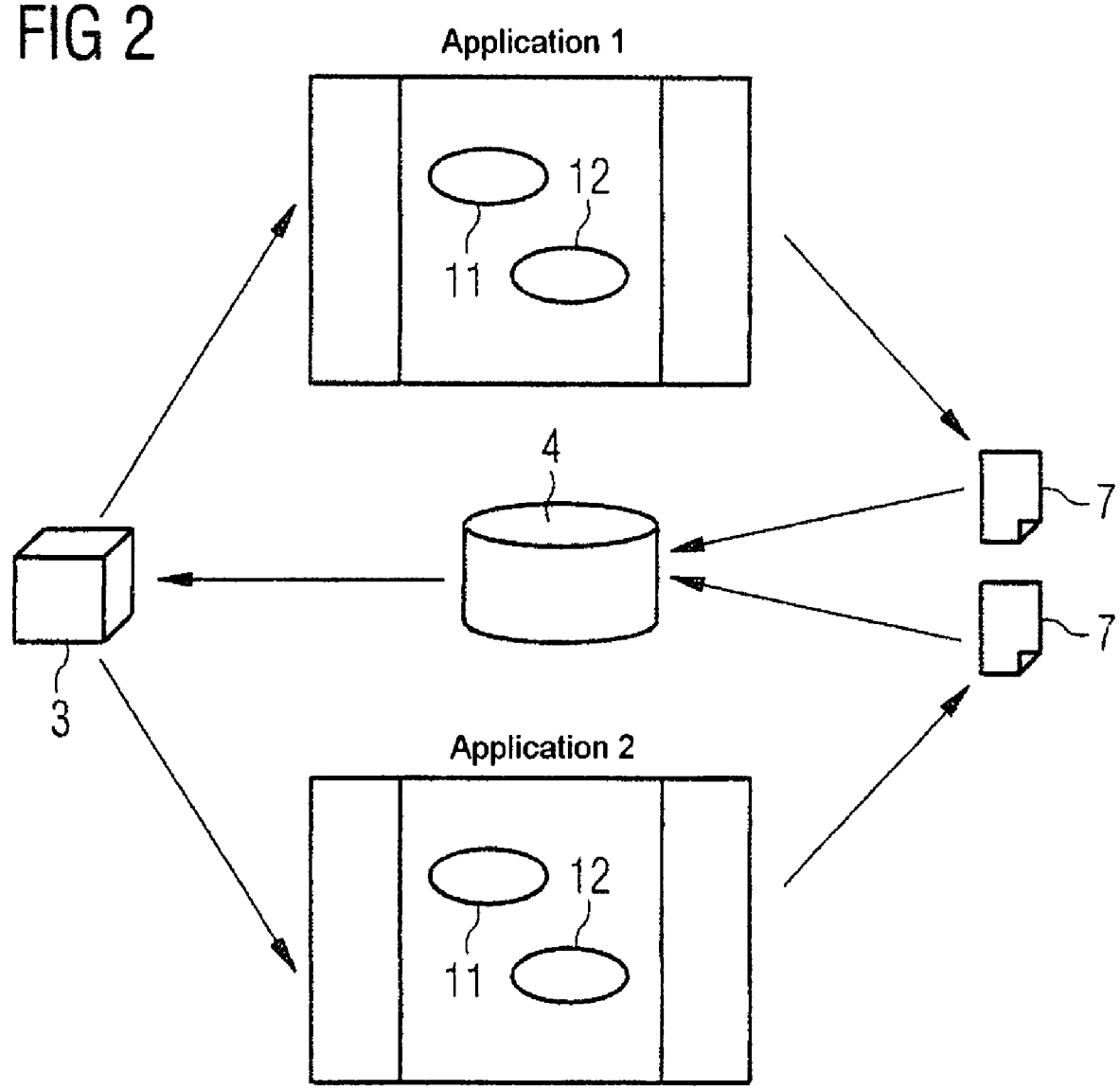
FIG. 2 shows an example of an application server for generating or reading out APS.

FIG. 2 shows an example of the generation of two APSs 7. To this end, in a first application the application server calls up an APS stored in the database 4, reads it out, applies the parameters and filters included therein to the associated IVB 3, and displays the view on the appropriate client 6. The user then has the option of changing this view by prescribing other image parameters. Tools 11 and functions 12 are available to him for this purpose. After the adaptation of the view with the aid of the desired image parameters, the image parameters required for this view, in particular the possibly changed filter function and further view parameters in the new APS 7 are stored in the central database 4 by means of the application server. The same mode of procedure is performed by the second application, which leads to another APS 7. It is also possible to generate an APS automatically by way of appropriate applications for which prescribed image parameters are required. This can be implemented, for example, for an automated pulmonary nodule evaluation, which makes a certain demand on the resolution, image sharpness and noise, in order to attain reliably reproducible results. Such an application then automatically applies the appropriate image parameters to the IVB by calling up the assigned APS, in order then to undertake the segmentation on the basis of the view generated.

Figure 4:
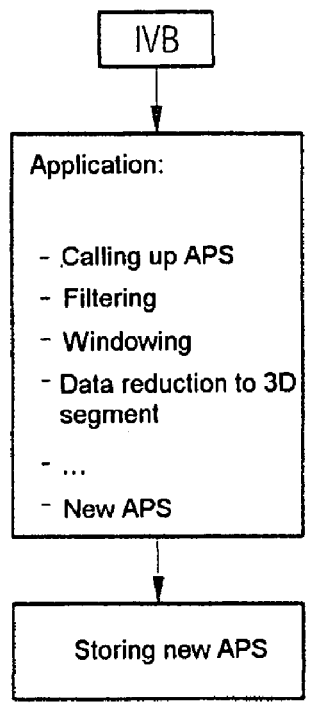
FIG. 4 shows an example of the generation and storage of APS.

FIG. 4 shows a further example of an adaptation of an existing APS in order to generate a new APS. In this case, the application on the application server 5 calls up an already existing APS relating to the IVB, in order to bring the data into a form that can be processed by the application. The further processing then includes filtering, windowing and reducing the data to a prescribed 2D surface or a 3D volume segment. Furthermore, another filter can also be applied to the IVB in order to generate another image quality. All requisite view parameters, in particular orientation, position, zoom factor, filter, segmentation, marker, color/gray scale level are stored as new or further APS in relation to the view then obtained.

Figure 5:
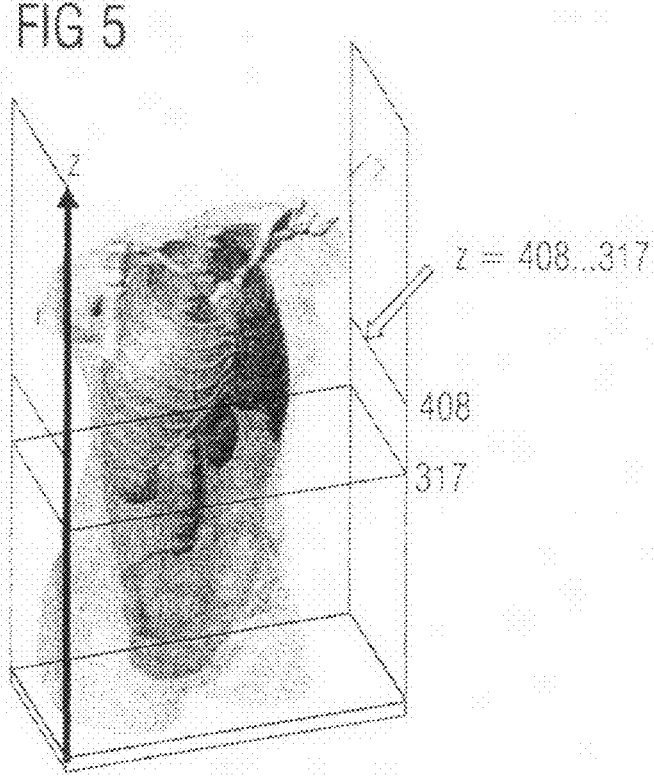
FIG. 5 shows a first example of a referencing of 3D segments.

FIG. 5 shows an example of the referencing of a 3D volume segment in an APS. In this simplest case, the use is made in the z-direction (direction of the system axis) prescribed in the CT picture, which can be derived in the IVB from the coordinate information. By specifying a start coordinate and an end coordinate in the z-direction, it is then possible to address a specific a 3D segment in the volume data record. This specification delimits the data generated for the view to the specified region that includes the heart, for example. Subsequently, a suitable filter can be applied to these reduced data in order to generate the desired view, if appropriate for further processing.

Figure 6:
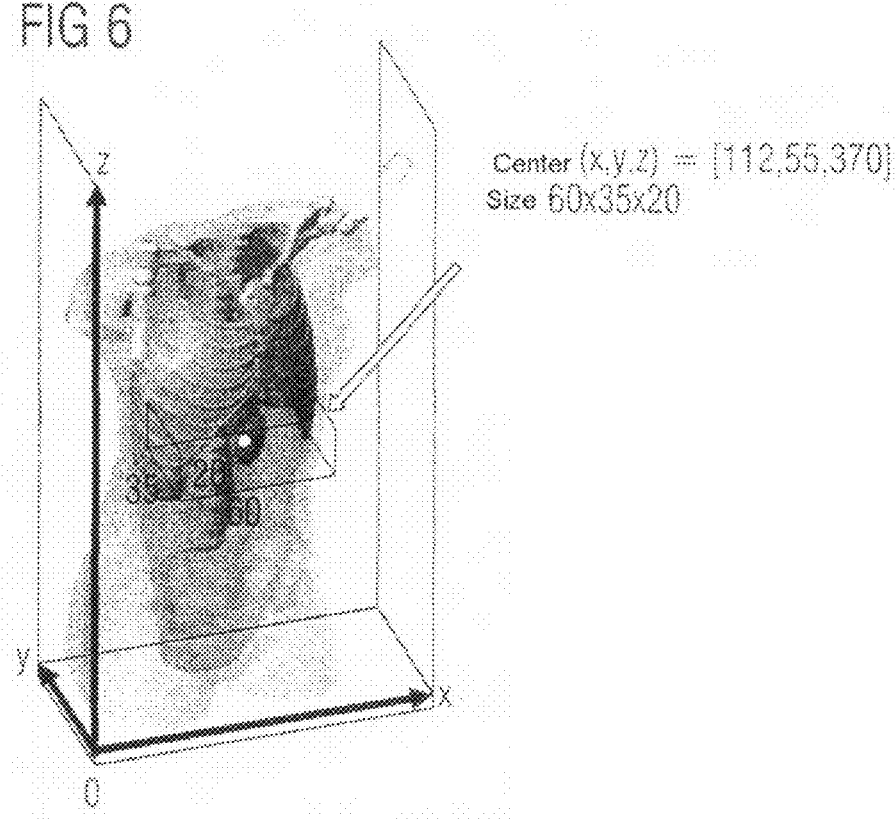
FIG. 6 shows a second example of a referencing of 3D segments.

FIG. 6 shows a further example in which the 3D coordinates of the center of a desired 3D volume segment, and the extent thereof in the x-, y- and z-directions are specified.

Figure 7:
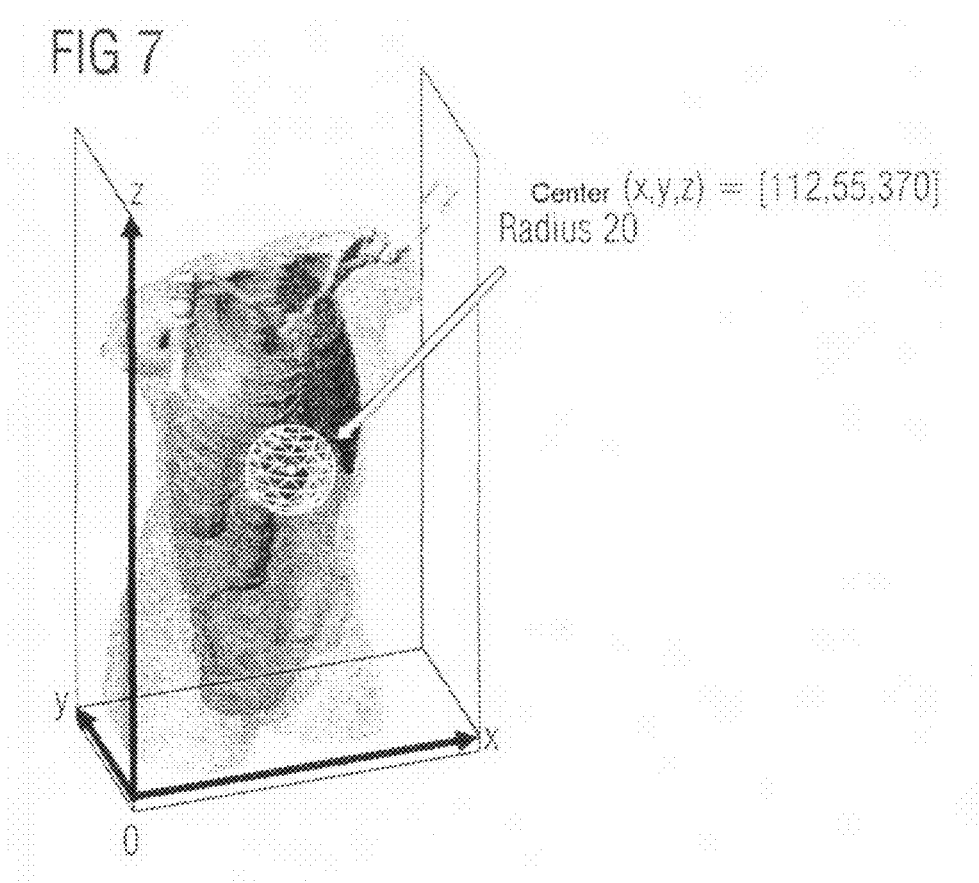
FIG. 7 shows a third example of a referencing of 3D segments.

A further example of such a referencing is shown in FIG. 7, where the 3D volume segment is of spherical shape. This segment is, in turn, defined here by specifying the three-dimensional coordinates of the center, and by specifying the radius of this volume segment.

Figure 8:
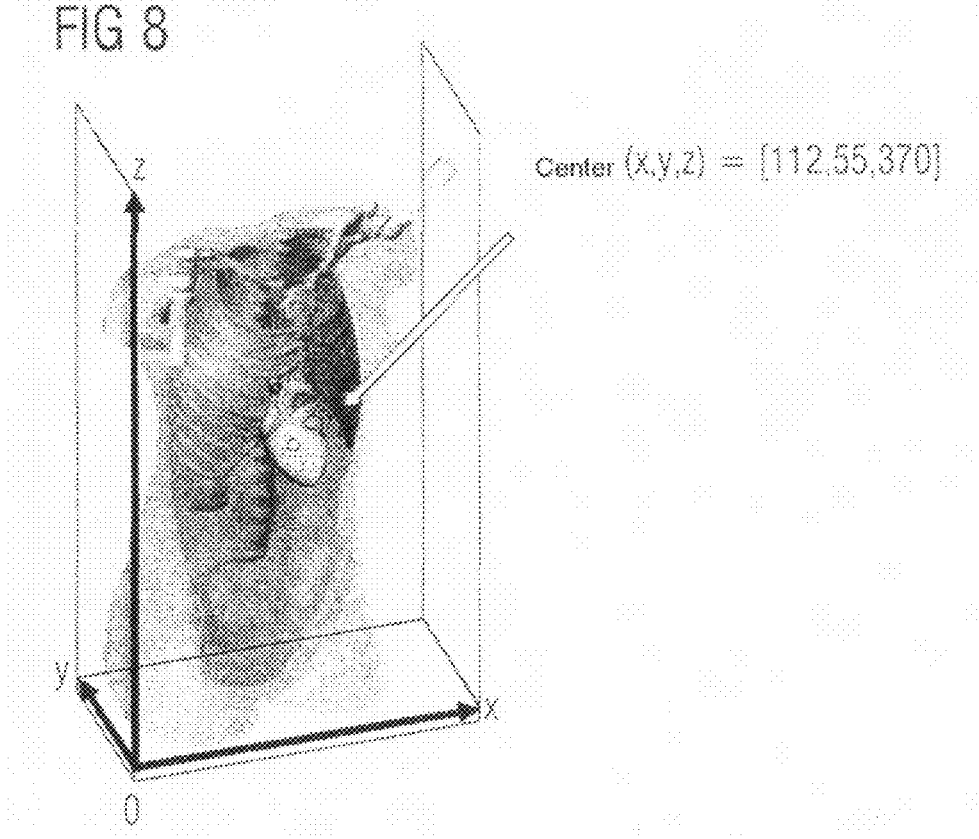
FIG. 8 shows a fourth example of a referencing of 3D segments.

Finally, FIG. 8 shows the referencing of a segmented organ or a segmented region inside the object area covered by the CT image data. Here, as well, the three-dimensional coordinates of the center of this segmented organ or of the segmented region are specified in turn for referencing.

The quantity of data to be processed can be greatly reduced in the case of the four last mentioned examples, since in each case what is displayed are only the data of the segmented or referenced area that are specified in the respective APS. Exactly the same views are displayed to the user each time this APS is called up anew.

Figure 9:
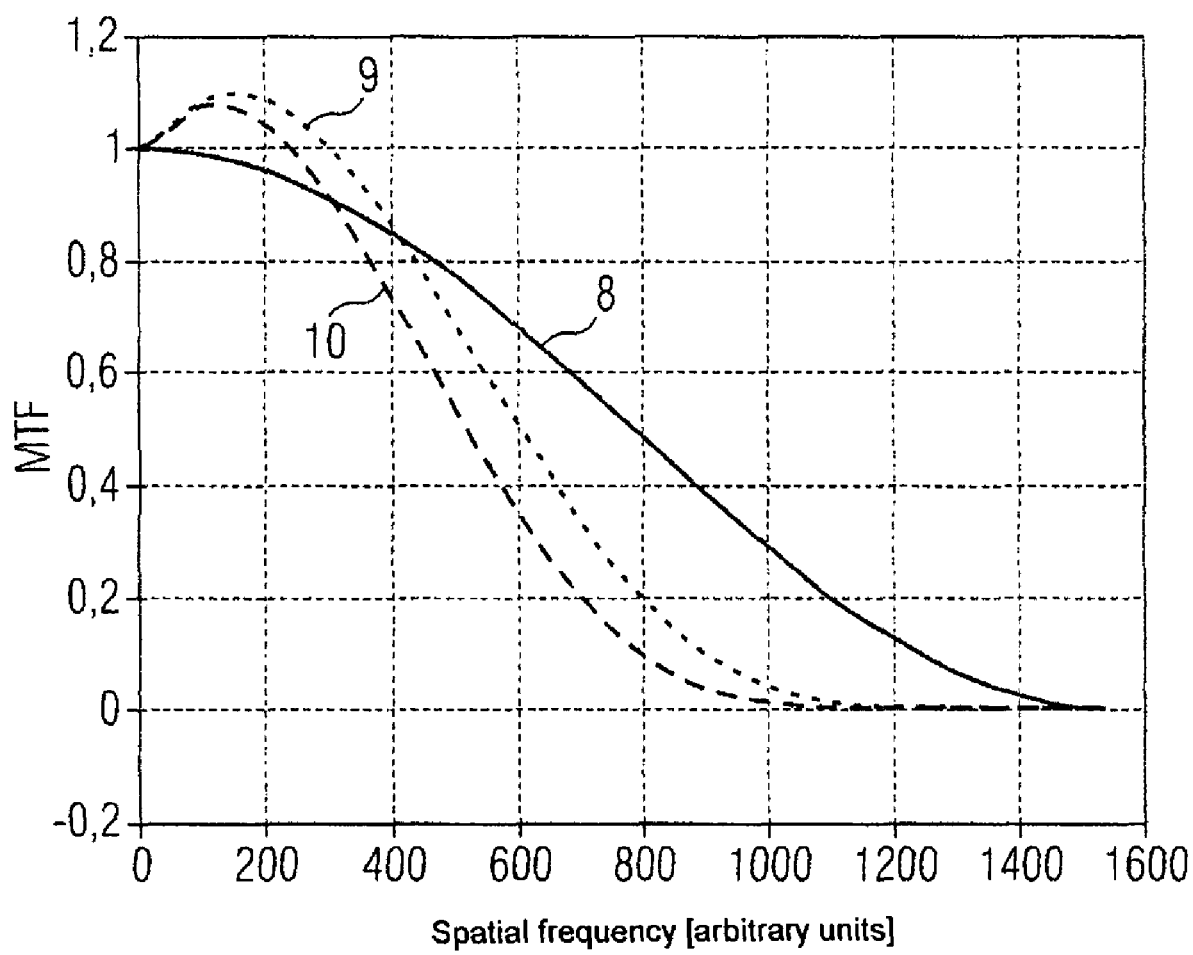
FIG. 9 shows an example of a modulation transfer function, and of a filter function with the aid of which a desired image impression can be generated.

FIG. 9 shows by way of example and for the purpose of illustration a solely one-dimensional modulation transfer function 8, and a filter function 9 that generates an image impression desired by the user. The modulation transfer function 8 is included in the IVB as a table. An image impression desired by the user corresponds to a function that is illustrated by the curve 10 in the diagram. This desired image impression (noise, sharpness, or the associated function and the modulation transfer function 8 contained in the IVB can then be used to calculate the filter function 9 that is required in order to come from the modulation transfer function 8 to the image impression or the function 10 associated therewith. The filter function 9 is stored in an APS, preferably with a few interpolation points as a table. By calling up this APS, another user, or the same one, can then generate the identical image impression from the IVB at any time without having to carry out a time consuming image reconstruction to that end.

At least one embodiment of the present method renders a reconstruction of a number of image series superfluous. This saves times and optimizes the clinical work flow. Image series no longer need to be reconstructed explicitly from the raw data. Instead, only the logic data views in the form of APSs are generated. A substantial data reduction is thereby achieved, since an APS requires scarcely any memory. The image data required for the diagnosis (view of IVB by means of APS) can be generated and exchanged as a function of manufacturer and device. The provision of the image data required for the diagnosis may then no longer be performed on the CT system itself, but can be undertaken at any desired workplaces. The time consuming transfer of image series, and the loading of these data into CT applications for postprocessing are eliminated.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for reproducibly generating views of tomographic image data, the method comprising:
   providing tomographic CT image data of an object area of an object, which include at least an X-ray attenuation value for each voxel of the object area, together with at least one of a three-dimensional modulation transfer function of the CT image data and a function from which the three-dimensional modulation transfer function is derivable, and of coordinate information from which coordinates of the voxels included in the CT image data are derivable in a fixed reference system of the object;
   generating at least one view of the object area by image filtering from the CT image data by using at least one of the functions, and the coordinate information;
   storing a filter algorithm used for the image filtering, and if appropriate further view parameters required for generating the view, in a view file assigned to the CT image data; and
   calling up the view file for the purpose of renewed generation of the view, and applying the filter algorithm, as well as, if appropriate, the further view parameters, to the CT image data.

2. The method as claimed in claim 1, wherein, for different applications, different filter algorithms are applied to generate various views of the object area that differ from one another in at least one of image sharpness, image noise and in a slice thickness of a fundamental slice of the object area, a dedicated view file being stored for each of the various views.

3. The method as claimed in claim 1, wherein a spatial orientation of the object, selected for the view, is stored in the view file as further view parameters.

4. The method as claimed in claim 1, wherein an item of information relating to an image segment selected for the view is stored in the view file as further view parameters.

5. The method as claimed in claim 1, wherein rendering parameters, selected for volume rendering, are stored in the view file as further view parameters.

6. The method as claimed in claim 1, wherein a position and extent of at least one volume segment of the object selected for the view are stored in the view file as further view parameters.

7. The method as claimed in claim 1, wherein one or more at least one of flat and curved 2D slice planes for key images are stored in the view file as further view parameters.

8. The method as claimed in claim 1, wherein the CT image data are provided as a volume data record.

9. The method as claimed in claim 1, wherein a reconstruction algorithm for high spatial resolution is used when generating the CT image data.

10. The method as claimed in claim 1, wherein the CT image data are provided in a common data record with at least one of the three-dimensional modulation transfer function of the CT image data and the function from which the three-dimensional modulation transfer function is derivable, and the coordinate information.

11. The method as claimed in claim 1, wherein the common data record is used as standard DICOM object.

12. The method as claimed in claim 1, wherein the view file is used as standard DICOM object.

13. The method as claimed in claim 2, wherein a spatial orientation of the object, selected for the view, is stored in the view file as further view parameters.

14. A non-transitory computer readable medium including program segments for, when executed on a computer device, causing the computer device to implement the method of claim 1.

15. The method as claimed in claim 2, wherein an item of information relating to an image segment selected for the view is stored in the view file as further view parameters.

16. The method as claimed in claim 2, wherein rendering parameters, selected for volume rendering, are stored in the view file as further view parameters.

17. The method as claimed in claim 2, wherein a position and extent of at least one volume segment of the object selected for the view are stored in the view file as further view parameters.

18. The method as claimed in claim 2, wherein one or more at least one of flat and curved 2D slice planes for key images are stored in the view file as further view parameters.

19. The method as claimed in claim 2, wherein the CT image data are provided as a volume data record.

20. The method as claimed in claim 2, wherein a reconstruction algorithm for high spatial resolution is used when generating the CT image data.

* * * * *